United States Patent [19]
Ishigami

[11] Patent Number: 4,987,411
[45] Date of Patent: Jan. 22, 1991

[54] POINTING APPARATUS

[75] Inventor: Hidetoshi Ishigami, Ootawara, Japan

[73] Assignee: Kabushiki Kaisha Toshiba, Kawasaki, Japan

[21] Appl. No.: 214,257

[22] Filed: Jul. 1, 1988

[30] Foreign Application Priority Data

Jul. 2, 1987 [JP] Japan ............................ 62-166203

[51] Int. Cl.$^5$ .......................... G06F 7/00; G09G 1/00
[52] U.S. Cl. ................................. 340/709; 340/706
[58] Field of Search ............... 340/706, 709, 710, 711

[56] References Cited
U.S. PATENT DOCUMENTS 4,586,035  4/1986  Baker et al. ..................... 340/706

FOREIGN PATENT DOCUMENTS 2151381  7/1985  United Kingdom ............... 340/709

Primary Examiner—Alvin E. Oberley
Assistant Examiner—Steve Saras
Attorney, Agent, or Firm—Finnegan, Henderson, Farabow, Garrett, and Dunner

[57] ABSTRACT

A pointing apparatus includes a direction determination circuit for determining a moving direction of a cursor in accordance with cursor current position information and cursor moving information input from a mouth, and a cursor jump circuit for recognizing the presence/absence of an icon to be designated by the cursor near a position along the moving direction determined by the direction determination circuit, and for jumping the cursor to the position of the icon.

6 Claims, 3 Drawing Sheets

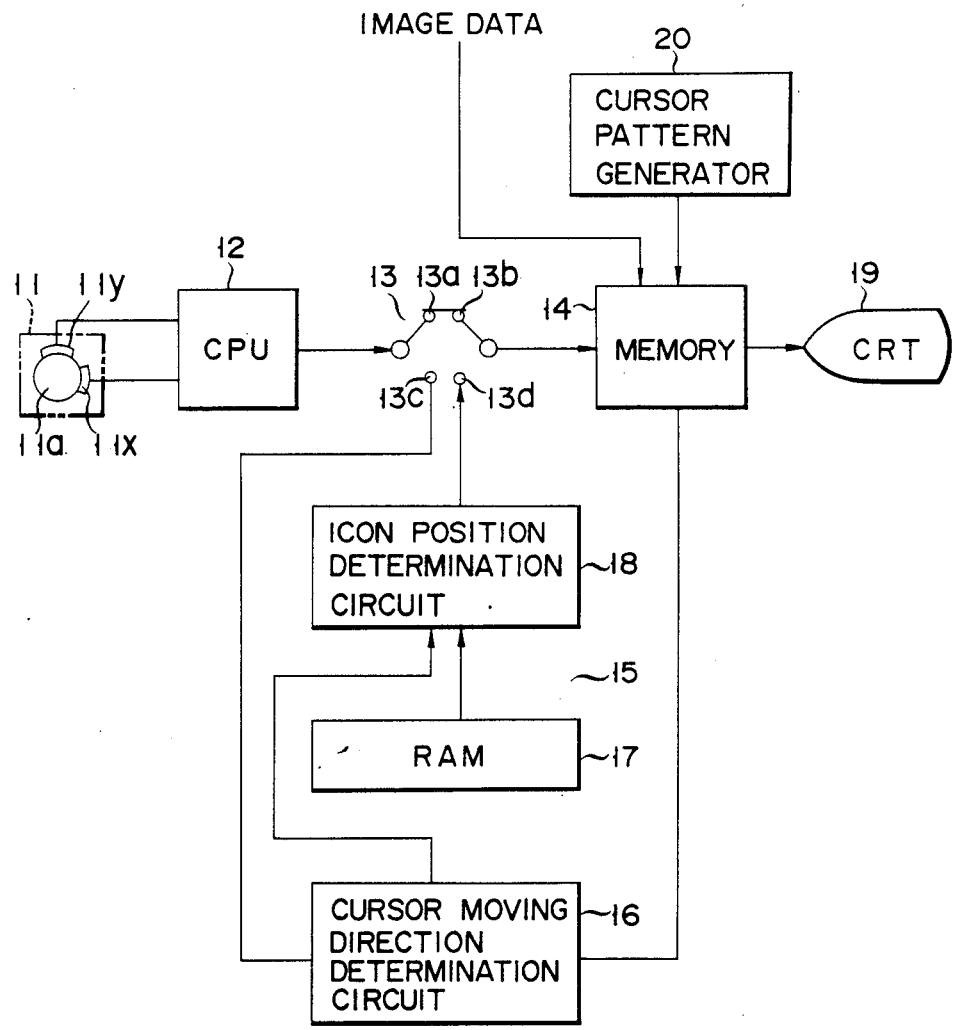
F I G. 1

4,987,411

POINTING APPARATUS

BACKGROUND OF THE INVENTION

1. Field of the Invention

The present invention relates to a pointing apparatus for inputting cursor moving information for moving a cursor displayed on a display.

2. Description of the Related Art

An example of the pointing apparatus used in a computer system is a mouse for setting the cursor for an object such as an icon displayed on a CRT display. When the mouse is moved on a desk, a ball located at the bottom of the mouse is rotated and a cursor information signal corresponding to a rotational direction of the ball is output. When the cursor information signal is input to a display device, the cursor displayed on the CRT display is moved on the screen in response to the cursor information signal.

According to a conventional pointing apparatus, when a current position of the cursor is far away from a position of an object to be designated, e.g., an icon, the mouse must be moved by a long distance or for a long period of time.

SUMMARY OF THE INVENTION

It is an object of the present invention to provide a pointing apparatus for immediately moving a cursor to a target object without greatly moving an operation member for moving the cursor, e.g., a mouse, even if a current position of the cursor is far away from a position of the target object to be designated.

According to the present invention, the pointing apparatus comprises a direction determination circuit for determining a cursor moving direction in accordance with cursor current position information and cursor moving information input from a pointing device, a confirming means for confirming the presence/absence of the object to be designated by the cursor on or near a position along the moving direction determined by the direction determination circuit, and a means for jumping and moving the cursor to the object position in response to the confirmation.

BRIEF DESCRIPTION OF THE DRAWINGS

FIG. 1 is a block circuit diagram of an image display device including a pointing apparatus according to an embodiment of the present invention;

DETAILED DESCRIPTION OF THE PREFERRED EMBODIMENTS

Figure 2:
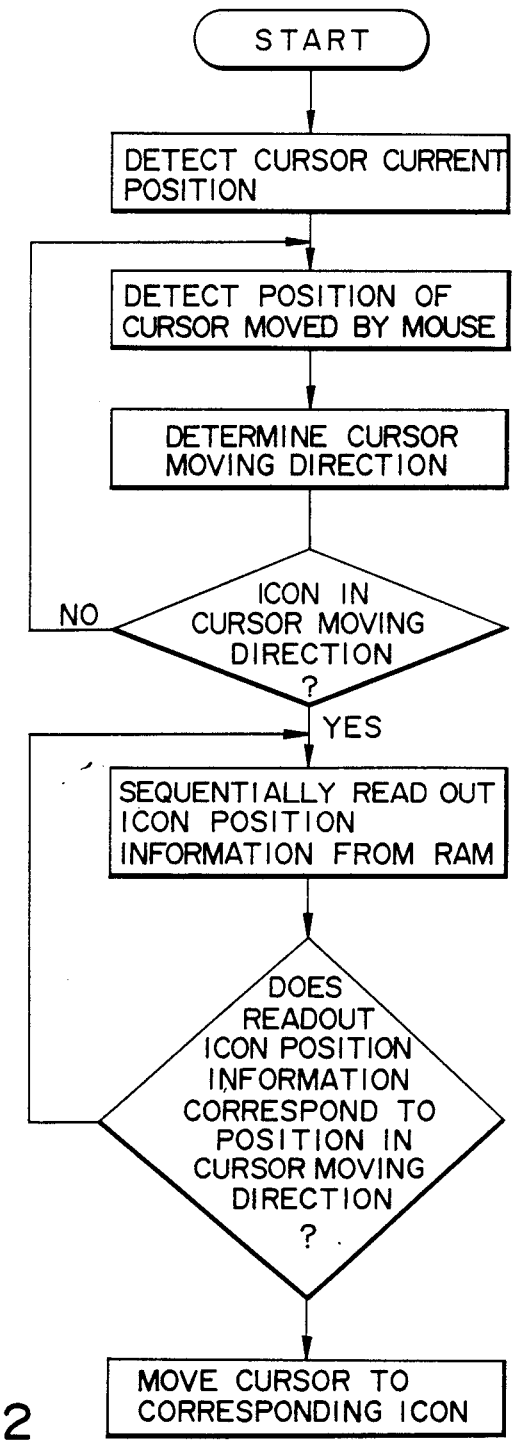
FIG. 2 is a flow chart for explaining an operation of the device shown in FIG. 1.

Referring to FIG. 1, a pointing device for inputting cursor moving information, e.g., mouse 11, comprises ball 11a which rotates in correspondence with the movement of the mouse, and movement detectors 11x and 11y abut against ball 11a to detect, in correspondence with a rotational direction of the ball, moving directions X and Y of mouse 11.

Movement detectors 11x and 11y are coupled to CPU 12. CPU 12 calculates the direction and degree of movement of mouse 11 on the basis of signals output from detectors 11x and 11y.

CPU 12 is connected to an input contact of switching circuit 13. Switching circuit 13 is a switch used for two systems. One system includes contacts 13a and 13b and is connected to memory 14. The other system includes contacts 13c and 13d and is coupled to cursor jump circuit 15.

Cursor jump circuit 15 comprises cursor moving direction determination circuit 16 connected to contact 13c of switching circuit 13, RAM 17 for storing an icon registration table, and icon position determination circuit 18.

Cursor moving direction determination circuit 16 determines a direction in which the cursor is to be moved, in accordance with cursor current position information stored in memory 14 and the information representing the direction and degree of movement of the cursor calculated by CPU 12. In other words, the direction, in which the cursor displayed on the screen of display 19 is to be jumped, is determined in correspondence with the current position and the moving direction of the cursor. The icon registration table stored in RAM 17 is formatted with identification and display position data of a plurality of icons displayed on CRT display 19. The plurality of icon data are sequentially read out. Icon position determination circuit 18 compares the cursor jump direction information obtained from cursor moving direction determination circuit 16 with the icon position information sequentially read out from RAM 17, and detects the icon information corresponding to the cursor jump direction. When the icon position determination circuit 18 recognizes the icon information, it outputs the icon position information to memory 14 as an address.

Cursor pattern generator 20 is coupled to memory 14 and outputs a predetermined cursor pattern, e.g., an arrow pattern to memory 14.

An operation of the device shown in FIG. 1 will be described with reference to a flow chart in FIG. 2 and display patterns shown in FIGS. 3A to 3C.

Figure 3A:
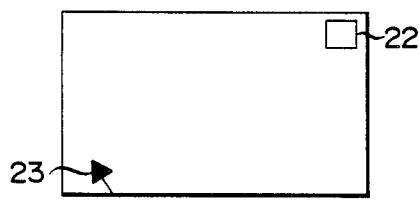
FIGS. 3A to 3C are views showing cursor moving states.

Assume that image data is supplied to CRT display 19 through memory 14 and that a predetermined image having icon 22 and a cursor pattern, i.e., arrow pattern 23, is displayed on CRT display 19, as shown in FIG. 3A. In this state, when mouse 11 is moved on a desk to move cursor 22 in a normal operation mode, X and Y moving signals are output to CPU 12 in correspondence with the movement of mouse 11. CPU 12 calculates the direction and degree of movement of mouse 11 on the basis of the X and Y moving signals, and outputs data which represents the moving direction and the degree of movement. When this data representing the moving direction and the degree of movement is input to memory 14 through contacts 13a and 13b of switching circuit 13, an address of a cursor pattern data stored in memory 14 is updated by the input data, i.e., data representing the moving direction and the degree of movement, and the cursor pattern data is then transferred to a position in the updated address. Thereby, cursor 22 displayed on display 19 is moved to a position which corresponds to the memory address.

When a cursor jump mode is set and executed with reference to the flow chart in FIG. 2, cursor 23 is caused to jump from the position shown in FIG. 3A to the position of icon 22.

When the cursor jump mode is initiated, e.g., by a switch (not shown) arranged in mouse 11, and mouse 11 is moved slightly toward icon 22, this "slight movement" is input to CPU 12 as X and Y moving signals. CPU 12 calculates the moving direction and the degree of movement of mouse 11 on the basis of the X and Y moving signals and outputs the data representing the moving direction and the degree of movement of mouse 11. These data are input to cursor moving direction determination circuit 16 in cursor jump circuit 15 through contact 13a of switching circuit 13.

Figure 3B:
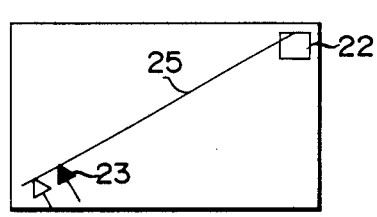
Figure 3C:
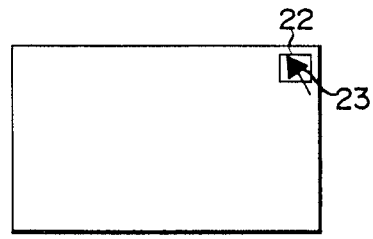

Cursor moving direction determination circuit 16 determines cursor moving direction 25 in accordance with the data representing the moving direction and the degree of movement from CPU 12 and the current position data from memory 14, as shown in FIG. 3B, and outputs the moving direction data to icon position determination circuit 18. Icon position determination circuit 18 calculates the coordinates near icon 22 by using the moving direction data, compares the calculated coordinates with the icon position information sequentially received from RAM 17, and retrieves the icon position information corresponding to the jump direction. The icon position information retrieved from icon position determination circuit 18 is input to memory 14 through contact 13d. At the same time, the cursor data stored in memory 14 is transferred in accordance with the input icon position information to a memory area in the address corresponding to icon 22. Correspondingly, cursor 23 displayed on display 19 is caused to jump to the position of icon 22. In other words, cursor 23 is instantaneously moved to the position of desired icon 22.

In the above jump mode, when a large number of icons are displayed on the screen of CRT display 19 and any icon, excluding a target icon, is positioned along moving direction 25, cursor 23 is caused to jump to a position of the icon, excluding the target icon. However, since the icon, excluding the target icon, is close to the target icon, when mouse 11 is slightly moved after the release of switch 13, the cursor can be moved to the position of the target icon.

According to the embodiment of the present invention as has been described above, the cursor jump circuit allows the cursor to instantaneously move to the position of the target icon, even if the cursor is far away from the target icon at the time the jump mode is initiated. Therefore, when the cursor is to be moved by a long distance, the moving amount of the mouse can be greatly reduced.

According to the invention, the cursor can be caused to jump to the position of the icon when it is spaced apart from the cursor. Accordingly, when the invention is applied to an medical imaging system, and the cursor can be instantaneously moved to the position of the icon to designate instructions concerning the types of filters or manipulation procedures of the device to be used, instructions concerning the selection of the types of image processing, and instructions concerning the measurement of the length and area of the displayed image, the designated instruction can be promptly executed.

What is claimed is:

1. A pointing apparatus for immediately moving a cursor from a current position to a position of one of a plurality of objects displayed on a display in response to displacement of an input device, comprising:
    means for generating a two-dimensional displacement signal corresponding to the displacement of said input device;
    means for determining a cursor move direction in accordance with said two-dimensional displacement signal and said current position of said cursor, and for determining said position of the one of said plurality of objects which is displayed most nearly along said cursor move direction; and
    means for moving said cursor to said position of said one of said plurality of objects displayed on said display in response to said determining means.

2. A pointing apparatus for immediately moving a cursor from a current position to a position of one of a plurality of objects displayed on a display in response to displacement of an input device, comprising:
    input means for generating a two-dimensional displacement signal corresponding to the displacement of said input device;
    cursor move direction means for determining a cursor move direction in accordance with said two-dimensional displacement signal;
    cursor memory means for storing said current position of said cursor and for providing a current position signal to said display to display said cursor;
    object memory means for storing the positions of said plurality of objects displayed on said display;
    object position means for reading one of said positions of said plurality of objects displayed on said display which is displaced most nearly along said cursor move direction, and for refreshing the contents of said cursor memory means to store said object position read by said object position means; and means for selectively activating said cursor move direction means.

3. The apparatus according to claim 2, wherein said cursor move direction means comprises cursor control means responsive to said two-dimensional displacement signal for refreshing the current position of said cursor and for providing a refreshed current position signal, and means for determining the cursor move direction in accordance with said current position signal provided by said cursor memory means and said refreshed current position signal provided by said cursor control means.

4. The apparatus according to claim 3, wherein said cursor control means comprises CPU means for calculating the displacement direction of said input means from said two-dimensional displacement signal.

5. The apparatus according to claim 2, wherein said object position memory means comprises storing means for storing an icon registration table formatted with identification and icon data corresponding to said object displayed on said display.

6. The apparatus according to claim 5, wherein said storing means reads out said icon data sequentially.

* * * * *